United States Patent [19]

Petit et al.

[11] Patent Number: 5,024,147
[45] Date of Patent: Jun. 18, 1991

[54] DEVICE FOR PITTING FRUIT, PARTICULARLY PRUNES

[76] Inventors: Gaston Petit, 8, rue des Coquelicots, 95000 Cergy; Daniel Monteiro, Hautefage La Tour, 47340, La Roque Timbaut, both of France

[21] Appl. No.: 213,812

[22] Filed: Jun. 30, 1988

Related U.S. Application Data

[63] Continuation of PCT FR87/00439 filed Nov. 5, 1989.

[30] Foreign Application Priority Data

Nov. 5, 1986 [FR] France ................... 86 15416
Jun. 4, 1987 [FR] France ................... 87 07828

[51] Int. Cl.$^5$ .......................... A23N 4/00; A23N 4/08
[52] U.S. Cl. ...................... 99/549; 99/557; 99/561; 99/565
[58] Field of Search ................... 99/547–550, 99/555, 556; 557–561, 565, 566; 426/484, 485

[56] References Cited

U.S. PATENT DOCUMENTS

| | | | |
|---|---|---|---|
| 3,318,349 | 5/1967 | Tomelleri | 99/565 |
| 3,731,615 | 5/1973 | Morgaroli et al. | 99/559 |
| 4,216,712 | 8/1980 | Altman | 99/561 |
| 4,313,373 | 2/1982 | Fehlmann | 99/549 |
| 4,485,732 | 12/1984 | Goudard | 99/557 |
| 4,913,044 | 4/1990 | Heath | 99/494 |

FOREIGN PATENT DOCUMENTS

| | | | |
|---|---|---|---|
| 0093679 | 11/1983 | European Pat. Off. | |
| 1925085 | 12/1969 | Fed. Rep. of Germany | |
| 2380745 | 9/1978 | France | |
| 475485 | 10/1952 | Italy | 99/556 |

*Primary Examiner*—Timothy F. Simone
*Attorney, Agent, or Firm*—Armstrong, Nikaido, Marmelstein, Kubovcik, & Murray

[57] ABSTRACT

The prunes are each supported by an annular trough (21A) of the tank (20A), on which trough abuts a sleeve (50A) mounted slidingly counter to an elastic return (52A) along a pitting rod (46A). The sleeves (50A) are juxtaposed one next to the other, while the rods (46A) are operated simultaneously by a jack (43A). The fall of the pits is checked by detection means (90A). These detection means (90A) are connected to a programmable automatic mechanism (95A), which controls the actuation of the means for removing the pitted prunes, and the unpitted prunes, if necessary, as a function of the values sensed by the detection means.

17 Claims, 7 Drawing Sheets

DEVICE FOR PITTING FRUIT, PARTICULARLY PRUNES

This application is a continuation of PCT application PCT/FR 87/00439 filed Nov. 5, 1987, and designating the United States and which claims priority based upon French patent application 86 15416, filed Nov. 5, 1986.

The invention concerns the prune processing industry, the prunes being obtained by desiccation of raw plums.

Prunes can be sold as such. But it is becoming more and more common to market pitted and stuffed prunes, which makes it necessary to first remove their pits, this operation being hereinafter referred to as "pitting".

Heretofore this operation requires the intervention of personnel. The known devices comprise means for driving a pitting rod or punch so that it comes down to where the prune is held in position. This is where a male or female operator holds the prune in proper position so that it can be pitted.

This invention aims essentially at providing a device for pitting fruit, particularly prunes, and this in a completely automatic manner.

It also aims at providing a device which can be easily installed in a prune processing line. The proposed device, which is of the forementioned type, is remarkable in that the holding station is defined by a small annular trough suitable for receiving the prune in a substantially vertical position, as well as by a sleeve mounted to slide along the pitting rod and suited for being carried with the pitting rod under the effect of an elastic return, this sleeve possessing a hollowed-out free end corresponding to the trough and facing it.

According to another aspect of the invention, the trough has an internal annular part defined by revolution of a generatrix which consists, at the top, of at least two straight segments having an increasingly oblique degree, whereas the corresponding recess of the sleeve has a straight section defined by revolution and in the general shape of an open V.

Very advantageously, the sleeve and the trough have along their periphery means for centering them with respect to one another.

According to another aspect of the invention, the device comprises a moving belt equipped with a plurality of identical troughs, adapted to cooperate sequentially with the rod-and-sleeve assembly, the moving belt being performed at the internal passage of each trough and being provided with an underlying reinforcement also perforated at the rod-and-sleeve assembly.

According to another aspect of the invention, the installation is completed upstream of the rod-and-sleeve assembly by a vibrating bowl adapted to bring the prunes one by one, in a substantially vertical position, into the respective troughs of successive tanks.

Another object of this invention is a device which allows the pitting of several fruits simultaneously.

According to a general definition of the variant of the invention, the actuating means comprises several rod-and-sleeve assemblies, each associated with an annular trough.

Very advantageously, the sleeves and the annular troughs have along their periphery means for centering the troughs in relation to the sleeves.

According to another aspect of the variant of the invention, the device comprises a moving belt equipped with a plurality of identical tanks each comprising a row of annular troughs juxtaposed one next to the other, said tanks being adapted to come sequentially in cooperation with the rod-and-sleeve assemblies, with each of which is associated respectively an annular trough, the moving belt being perforated at the internal passage of each trough and being equipped with an underlying reinforcement, also perforated at the rod-and-sleeve assemblies.

According to another aspect of the variant of the invention, the installation is completed, upstream of each rod-and-sleeve assembly, by a vibrating bowl adapted to bring the prunes one by one, in a substantially vertical position, into the successive tanks.

The rod-and-sleeve assemblies are preferably driven simultaneously by a jack.

According to a preferred embodiment of the variant of the invention, the device comprises means of detection suitable for monitoring the fall of the pits after they have passed through a respective trough, as well as means for collecting them.

According to another preferred embodiment of the device of the variant of the invention, the device comprises downstream of each rod-and-sleeve assembly first means of discharge adapted to remove respectively, from the troughs of the successive tanks, the unpitted prunes detected by the checking means, and second means of discharge placed downstream of the first means of discharge and adapted to remove the pitted prunes respectively from the troughs of the successive tanks.

According to yet another preferred embodiment of the device of the variant of the invention, the device comprises means for the selective collection of pitted and unpitted prunes, after these have been respectively removed from the respective troughs of the successive tanks.

Preferably, the first and second means of discharge comprise discharge punches controlled by at least one jack.

Very advantageously, the device according to the variant of the invention comprises a programmable automatic mechanism adapted to control the operation of the first and second means of discharge in function of the values sensed by the means of detection.

Other characteristics and advantages of the invention will be apparent from a study of the following detailed description and attached drawings, in which.

The attached drawings include in numerous instances elements which are given a definite form. Therefore they will not only serve to clarify the following description, but will also contribute to the definition of the invention, if need be. This is especially true for the particular forms involved in the very pitting and discharge operations.

Figure 1:
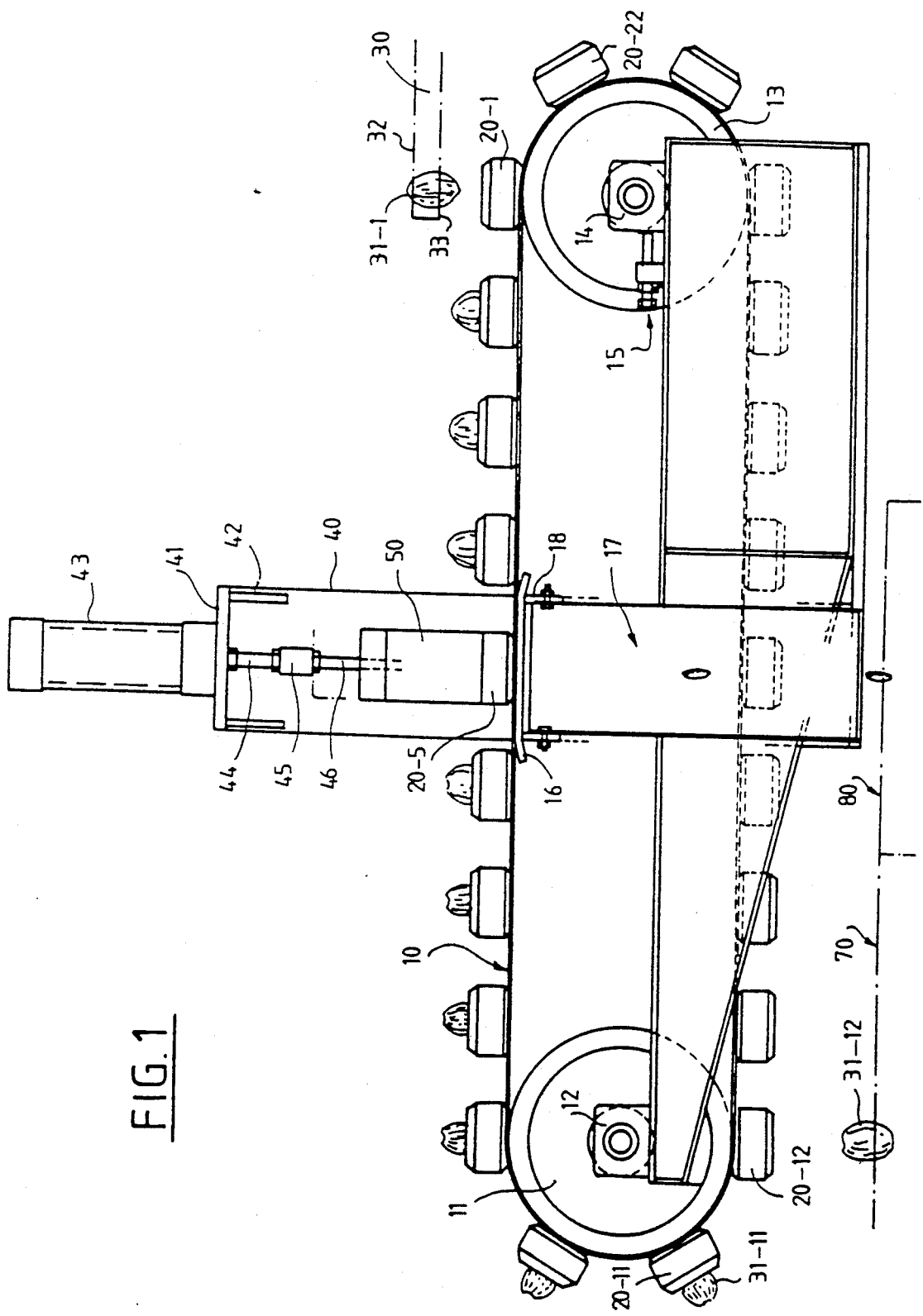
FIG. 1 is a side view of a pitting installation according to the invention.

In FIG. 1, a moving belt 10 circulates around two end rollers 11 and 13, carried respectively by bearings 12 and 14, on one of which is driven by a motor (not shown). The bearing 14 is adjustable in position under the effect of a screw 15 for imparting tension to the belt 10.

The pitting device itself is provided, for example, substantially in the middle of the space included between the rollers 11 and 13.

This brings into play a reinforcement 16 underlying the belt 10, and provided near the bottom thereof with square brackets such as 18 which enable the attachment of a pipe 17 for the discharge of the pits.

On the moving belt are mounted troughs 20, of which there are twenty-two in this case, which are distinguished by a suffix denoting their order, beginning from the spot where the prunes are placed in the troughs.

This operation is carried out by a vibrating bowl 30, of the cylindrical type, equipped with an helicoidal slide 32. This slide 32 enables, as a result of the vibrations, the straightening of the prune to a vertical position and the conveying of the prune to the vibrating distribution slide 33 placed directly above the center of trough 20.

This bowl delivers the prunes one by one into the troughs, in a controlled manner, in function of the step by step advance of the troughs and of the moving belt 10. This Figure shows a prune 31-1 descending into the trough 20-1.

The subsequent troughs are thus already loaded with their prunes, towards the left, on the upper portion of the conveyer belt 10.

The trough 20-5 comprises a prune (not visible in FIG. 1) about to be pitted.

Figure 2:
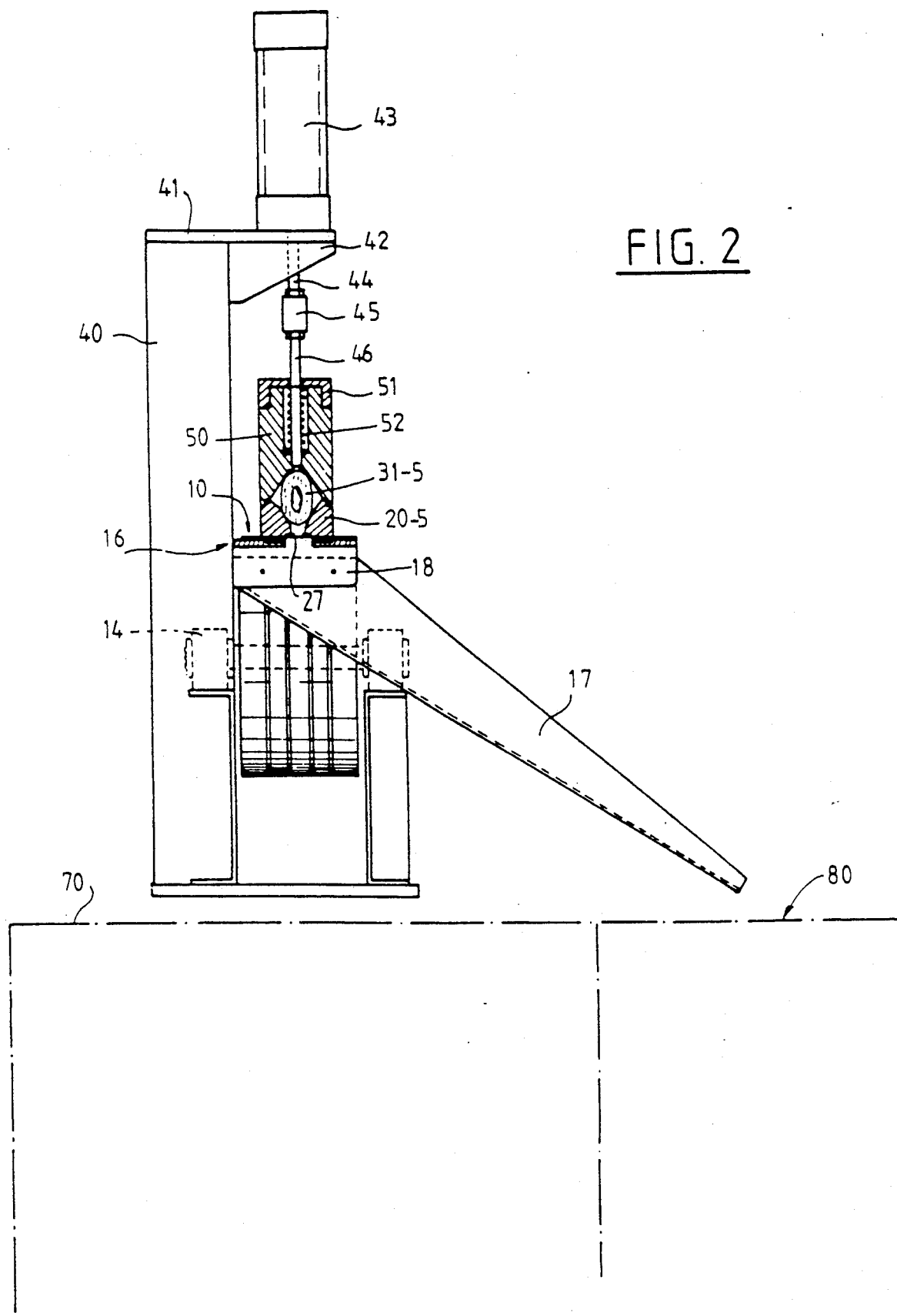
FIG. 2 is an end view of the same pitting installation.

For this, a jack 43, for example a pneumatic one, is mounted on a support plate 41 held by square brackets 42 on a frame 40 (FIGS. 1 and 2). The jack 43 drives a rod 44 which, through a relay connection 45, drives the pitting rod 46 itself.

Figure 3:
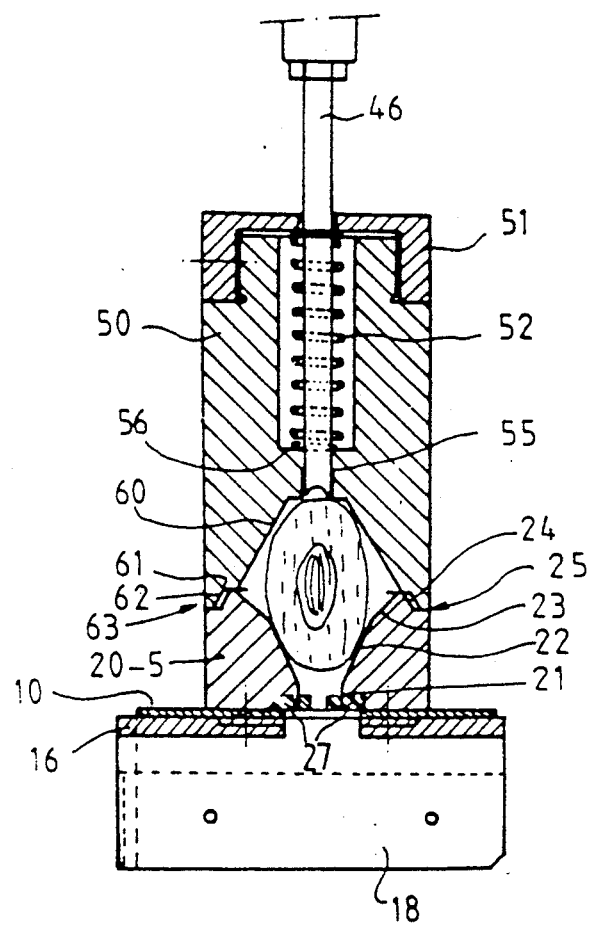
FIG. 3 is a partial view in greater detail, enabling a better understanding of an essential element of the pitting device according to the invention.

This rod has a notched and, as can be seen in FIGS. 2 and 3; the principle of the use of such shape for pitting being known.

FIGS. 2 and 3 show that a sleeve 50 is mounted to slide along the rod 46. This sleeve 50 is generally cylindrical in form, its upper portion comprising a recess adapted to receive a cap 51 which contributes to guiding it as it slides along the rod 46. At the other end, the guiding is provided by a bore 55 in the sleeve 50. Above the bore 55, the inside of the sleeve is recessed to make room for the placement of a spring 52 mounted in compression between the cap 51 and the shoulder 56 which defines the bottom end of the placement of this spring 56.

Thus, the normal situation is that the sleeve 50 descends together with the rods 46.

At the end of the descent, the sleeve comes to bear by its lower periphery on the centering elements provided for each of the troughs 1.

On the side of the sleeve, the centering is provided by an annular radial plate 61, followed by an oblique projection 62 ending in another annular plate 63, the entire assembly having the general form of a stretched out Z.

On the side of the trough, an external peripheric plate 25 is provided, followed by a projection 24 which is oblique toward the inside.

The Figures show furthermore that each trough 20 has, at its lower portion, a cylindrical bore 21 comprising an elastic membrane 27 followed, toward the top, by a recess 22 in the shape of a truncated cone, then by an even more open recess 23 in the shape of a truncated cone. In other words, the upper part of the internal annular face of the trough is defined by two increasingly oblique straight lines 22 and 23. The term "straight line" is used here to define the general form of the trough, it being noted that it is not absolutely rectilinear.

It can be seen furthermore that opposite each orifice 21 of each trough, the moving belt 10 has a recess which may also be wider than the orifice 21.

Moreover, the underlying reinforcement 13 at the pitting station also has an orifice for the release of prunes, which orifice may have the same diameter as those of the moving belt 10.

As to the sleeve 50, it has, in addition to the centering means already described, an internal recess along its lower part, marked 60. This recess 60, which is defined by revolution like the internal recess of the troughs, may have the general shape of a fairly open V with a flat base (on top).

We shall now return to the pitting operation itself. FIG. 1 shows that the pits come out through the pipe 17, while the pitted prunes continue to move on the moving belt and reach a position 31-11, where they are ready to fall into a container 70, whereas this fall is already in process at the position 20-12. The pits themselves fall from the pipe 17 into the container 80.

By the use of the vibrating bowl such as described above, it has been proven possible to place the prunes automatically in the troughs in a position which is, if not vertical, at least relatively little inclined with respect to the vertical. What is necessary is that the prunes not be placed in the troughs in a completely lying down position. This condition is realized, with an excellent percentage of success, by conjunction of the effect of the vibrating bowl which places the prunes in a vertical position, and the effect of the fall of the prunes along a limited distance.

Whether it is vertical or slightly inclined, the prune is straightened by the joint action of the sleeve 50 and the trough 20-5 at the pitting station. This is ensured by the respective surfaces of these two elements and also, to a certain extent, by the possibilities of interaction offered by the existence of the elastic return 52, and possibly the interaction between the sleeve 50 and the pitting rod, for straightening the prune.

After the prune has been straightened, the pitting operation itself takes place in known manner; the rod comes down inside the fruit and catches the point of the pit, driving it out through the opposite end. The pit then traverses the different orifices already mentioned to reach the pipe 17 to fall into the container 80.

This invention is of course not limited to the embodiment described.

For example, any other type of driving mechanism, such as a cam, may be utilized instead of the jack 43.

Furthermore, the prune can also be guided as it descends from the vibrating bowl or hopper towards a trough, so as to facilitate its vertical positioning. This guiding can be obtained, in particular, by a sort of funnel opening just above the trough, at a distance compatible with the normal size of the prunes.

This invention also concerns a device enabling the pitting of several fruits simultaneously. The variant of the invention comprises several elements similar to those of the invention. This is why, in order to differentiate between them, the references of the essential components of the variant of the invention are followed by the letter A.

Figure 4:
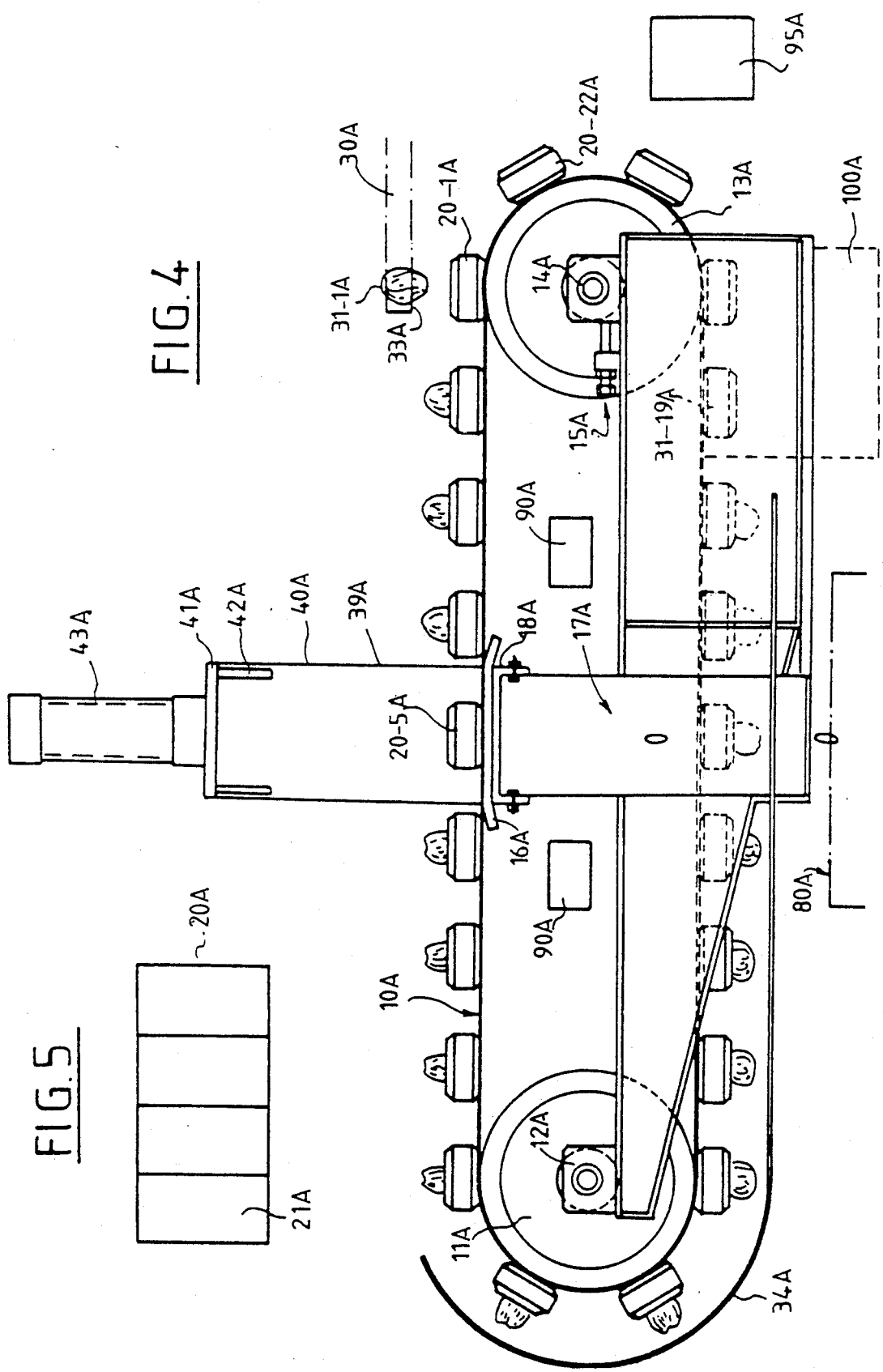
FIG. 4 is a side view taken from the front of a pitting installation according to the variant of the invention.

In FIG. 4 a moving belt 10A moves, for example from left to right, around two end rollers 11A and 13A, carried respectively by bearings 12A and 14A, one of which is driven by a motor (not shown). The bearing 14A is adjustable in position under the effect of a screw 15A for imparting tension to the belt 10A.

A pitting device comprising several rod-and-sleeve assemblies, as described below, is provided for example substantially in the middle of the space comprised between the rollers 11A and 13A. These bring into play a reinforcement 16A underlying the belt 10A and equipped at the bottom with brackets such as 18A, which enable the fastening of a pipe 17A for the discharge of the pits.

Figure 5:
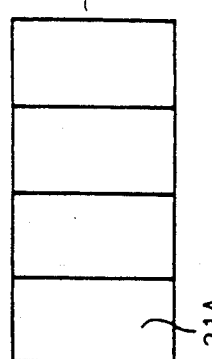
FIG. 5 represents schematically a tank comprising several annular troughs according to the variant of the invention.

Tanks 20A are mounted on the moving belt. As illustrated in FIG. 5, each of the tanks 20A comprises a row of annular troughs 21A juxtaposed one next to the other. In the case shown here, the tank 20A comprises four annular troughs 21A juxtaposed one next to the other and similar to those described in the principal patent.

Referring once more to FIG. 4, it can be seen that the tanks 20A are here 22 in number, and are distinguished by a suffix denoting their order, beginning with the spot where the prunes are placed in the respective troughs 21A of the successive tanks 20A.

This operation is carried out by a plurality of vibrating bowls 30A of the cylindrical type, placed in parallel and each equipped with a helicoidal slide 32A. Advantageously, the number of bowls is equal to that of the troughs 21A for each tank 20A. In order to simplify the drawing, only one vibrating bowl 30A is shown. Each of the slides 32A serves, under the effect of vibrations, to straighten the prune vertically and to convey it to the vibrating distributing slide 33A, located directly above each of the centers of troughs 21A of the successive tanks 20A.

Each bowl delivers the prunes one by one into the respective troughs 21A of the successive tanks 20A, in a controlled manner, in function of the step by step advance of the tanks and the moving belt 10A. A prune 31A-1 is shown descending into a trough 21A-1 of the tank 20A-1. For example, the troughs 21A have a width of 62 millimeters and a length of 210 millimeters. They are, for example, located at a pitch of 63 millimiters. Twenty-two tanks 20A are shown here, namely eighty-eight annular troughs 21A.

It is clearly understood that this is only an example of an embodiment which is intended to facilitate the comprehension of the structure of the pitting device according to the invention and that, in practice, the tanks 20A may consist of many more annular troughs 21A.

For example, the moving speed of the moving belt 10A is adjustable from zero to sixty tanks 20A per minute.

For example, the speed of the step by step advance is of the order of fifty tanks 20A per minute.

The troughs of the next tanks 20A are thus already loaded with their prunes, towards the left, on the upper portion of the moving belt 10A and on the lower portion of the belt, up to the means of discharge 100A of the prunes, as described below.

The prunes placed respectively in each annular trough 21A-5 of the tank 20A-5 (not visible in FIG. 4) are pitted simultaneously by the means which drive the rod-and-sleeve assemblies 40A shown roughly in FIG. 4.

Figure 6:
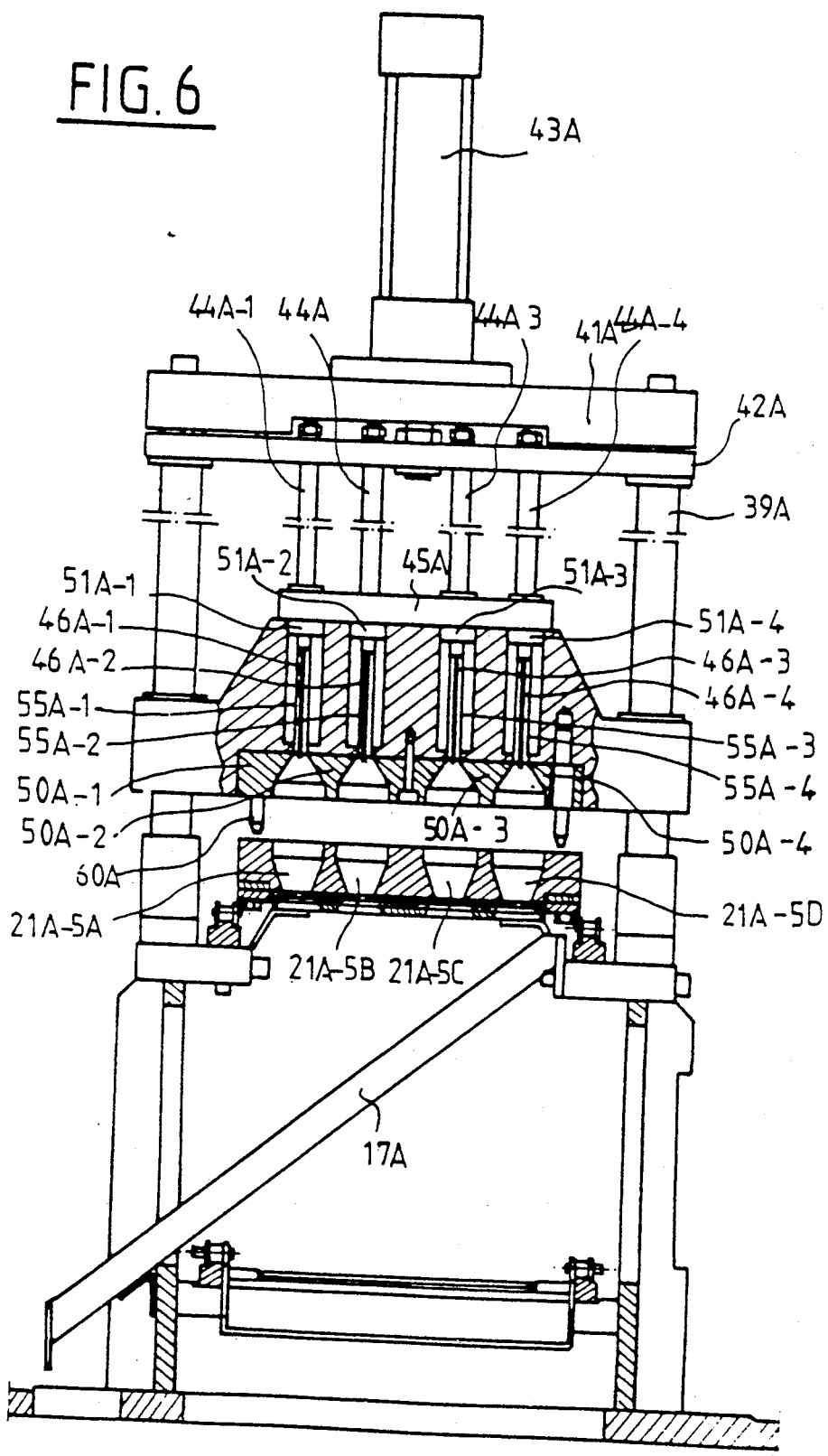
FIG. 6 is an end view of the same pitting installation showing the rod-and-sleeve assemblies according to the variant of the invention.

FIG. 6 shows in greater detail the means 40A for actuating the rod-and-sleeve assemblies.

They include a jack 43A, for example a pneumatic one, mounted on a support plate 41A held by square brackets 42A on a frame 39A. The jack 43A actuates simultaneously four rods 44A referenced individually as 44A-1, 44A-2, 44A-3 and 44A-4 each of which, through a relay connection 45A, actuates a pitting rod 46A referenced individually as 46A-1, 46A-2, 46A-3 and 46A-4.

Each pitting rod 46A has a notched end; the principle of the use of such shape for pitting being known.

On each rod 46A is mounted slidingly a sleeve 50A referenced individually as 50A-1, 50A-2, 50A-3 and 50A-4. The sleeves 50A are juxtaposed one next to the other.

Each sleeve 50A is generally cylindrical in shape, with a recess at its upper portion adapted to receive a cap 51A, referenced individually as 51A-1, 51A-2, 51A-3 and 51A-4, serving to guide its slide over the associated rod 46A. At the other end, guiding is provided by a bore 55A referenced individually as 55A-1, 55A-2, 55A-3 and 55A-4 of the sleeve 50A. Above the bore 55A, the interior of the sleeve is recessed to make room for the placement of a spring (not shown) mounted in compression between the cap 51A and a shoulder (not shown) which defines the bottom end of the placement of the spring.

Thus the normal situation is that each sleeve 50A descends with each rod 46A.

At the end of the descent, each sleeve bears by its lower periphery on the centering elements 60A, assuring the positive positioning of the sleeves with their associated troughs which contain the prunes to be pitted.

The essential characteristic of the variant of the invention is the multiplicity of rod-and-sleeve assemblies, each adapted to pit one fruit. Taken individually, these rod-and-sleeve assemblies as well as the troughs are not different from those described in the invention in reference to FIGS. 1 to 3. It is therefore possible to find a more detailed description of them, if need be.

FIGS. 4 and 6 show that the pits exit through the pipe 17A and fall into the container 80A, while the pitted (or unpitted prunes, if any) continue to move on the moving belt, to reach a position 31A-19 where they are discharged by the means of discharge 100A described below.

A stainless steel deflector 34A prevents the prunes from falling despite the turning upside down of the tanks 20A.

Advantageously the fall of the pits is monitored by means of detection 90A such as photo-electric cells. For example, the photo-electric cells are placed on either side of the pipe 17A.

The fall of the pit enables the monitoring of the pitting of the prunes. This monitoring is taken in account by a programmable automatic mechanism 95A with time-lag register adapted to control the operation of actuating the means of discharge in function of the values sensed by the means of detection 90A. For example, the programmable automatic mechanism 95A is connected on the one hand to the means of detection 90A, the role of which is to sense information, and on the other hand to the means of discharge 100A, the role of which is to act in function of the values sensed by the means of detection 90A.

Figure 7:
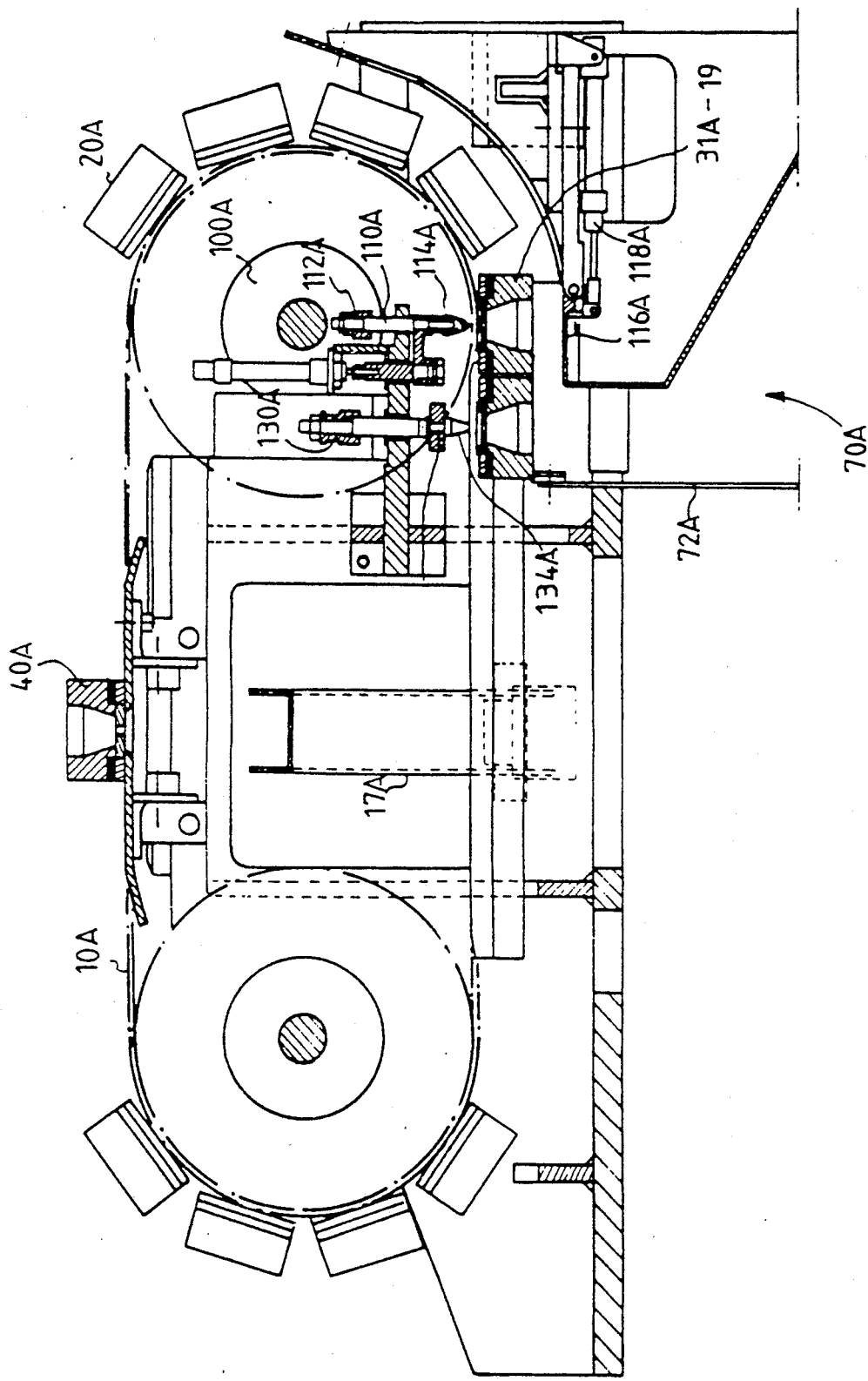
FIG. 7 is a side view taken from the rear of the pitting installation showing the means of discharge according to the variant of the invention.
Figure 8:
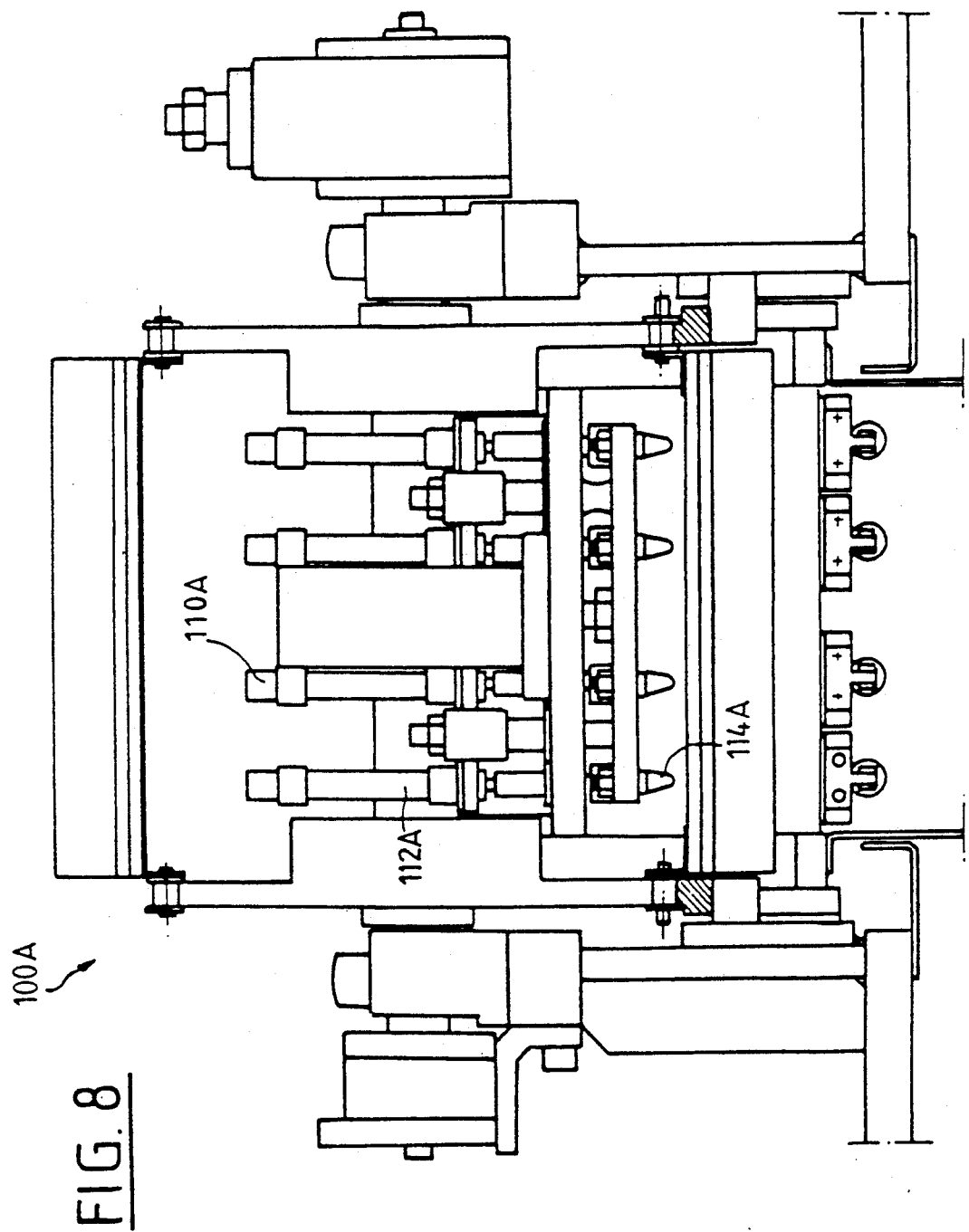
FIG. 8 is a partial view in greater detail, illustrating the operation of the means of discharge of the prunes according to the variant of the invention.

FIG. 7 shows the means of discharge 100A which are placed downstream of the means for actuating the rod-and-sleeve assemblies 40A.

They include first means of discharge 110A adapted to discharge the unpitted prunes identified by the means of detection 90A. In FIGS. 6 and 7 it can be seen that the means 110A comprise four jacks 112A of the pneumatic type, for example of the short travel type, equipped with a spherical tip 114A and adapted, upon command from the programmable automatic mechanism 95A, to discharge the unpitted prunes from the troughs 21A.

Advantageously, the programmable automatic mechanism 95A simultaneously controls the opening of a trap 116A located opposite the means of discharge 110A, thus making it possible to discharge the unpitted prune or prunes which are eventually recycled or used for other purposes. The control of the trap opening is performed for example by four jacks 118A located under the deflector which prevents the prunes from falling.

The means of discharge 100A also include second means of discharge 130A adapted to discharge the pitted prunes identified by the means of detection 90A. These means 130A include four punches 132A, of the short travel type, equipped with a spherical tip 134A. The second means of discharge 130A are located at the next step with respect to the first means of discharge 110A. In order to simplify the drawing, only one punch 132A is shown.

The four punches 132A are controlled by a pneumatic type jack (not shown), for example, and they discharge simultaneously the prunes contained in the troughs 21A.

The pitted prunes are recovered in a small cage 70A through a stainless steel pipe 72A.

In general, the pitted prunes, and unpitted prunes, if any, are taken in account by the programmable automatic mechanism 95A.

Of course the variant of the invention is not limited to the embodiments described. The pitting device may be fed manually in function of the rate of utilization. Nevertheless, the variant of the invention provides for an entirely automatic feed, through a group of vibrating bowls and ramps.

The prunes are conveyed by means of vibrating ramps and are fed to vertical tubes closed by a trap and located above the annular troughs 21A of the tanks 20A.

Opening of the trap to release the prune is done by means of a pneumatic type jack controlled by the step by step advance of the machine.

The variant of the invention also embodies for workers' health and safety:

protective housing equipped with a tamper-proof emergency shut-down, which prevents operation of the machine if it is not closed properly;

operation of the machine requiring the use of both hands;

punch-type emergency stop;

complete emptying of the machine for cleaning operations or for temporary shut-down; and use of time delayed end-of-travel switches.

We claim:

1. A fruit-pitting device, particularly for prunes, comprising means for actuating a pitting rod (46), so that it goes down in a holding position where a prune is held, characterized in that said holding position is defined by an annular trough (20) for collecting and holding a prune in a substantially vertical position, and by a sleeve (50) mounted slidingly along said rod (46) and carried therewith under the effect of an elastic return in compression within said sleeve (50) when said prune is in said holding position, said sleeve (50) having hallowed-out free end (60) at the trough end and disposed opposite thereto, said trough end of said sleeve contacting said trough when said prune is in said holding position and said elastic return is compressed.

2. The device as set forth in claim 1, characterized in that the trough (20) has an internal annular part defined by revolution of a generatrix which consists of, at the top, at least two straight segments (22, 23) of an increasingly oblique character, whereas the corresponding recess (60) of the sleeve has a straight section defined by revolution and having the general shape of an open V.

3. The device as set forth in claim 1 or 2, characterized in that the sleeve (50) and the trough (20) have, along their periphery, means (24, 25, 62, 63) enabling them to be centered relative to each other.

4. The device as set forth in claim 1, characterized in that it comprises a moving belt (10) having a plurality of identical troughs (20) adapted to cooperate sequentially with the rod-and-sleeve assembly (46, 50), the moving belt being perforated opposite the internal duct of each trough, and being provided with an underlying reinforcement (6), also perforated, opposite the rod-and-sleeve assembly.

5. The device as set forth in claim 4, characterized in that it comprises, upstream of the rod-and-sleeve assembly, a vibratory hopper feeder (30) adapted to bring the prunes, one by one, into a substantially vertical position in the successive troughs.

6. The device as set forth in claim 1, characterized in that the rod-and-sleeve assembly is actuated by a jack (43).

7. The device as set forth in claim 1, characterized in that it comprises means for selectively collecting the pitted prunes (70) and their pits (80) after they have passed through a corresponding through.

8. The device as set forth in claim 1, characterized in that the actuating means (40A) comprises a plurality of rod-and-sleeve assemblies, each one of which is associated with an annular trough (21A).

9. The device as set forth in claim 8, characterized in that the sleeves (50A) and the annular troughs (21A) have, along their periphery, means (60A) enabling the troughs (21A) centered relative to the sleeves (50A).

10. The device as set forth in claim 8, characterized in that it comprises a moving belt (10A) equipped with a plurality of identical tanks (20A), each one of which comprises a row of annular troughs (21A) juxtaposed one next to the other, said tanks (20A) being adapted to cooperate sequentially with the rod-and-sleeve assemblies, one annular trough (21A) each being associated with each rod-and-sleeve assembly, the moving belt (10A) being perforated opposite the internal duct of each trough (21A), and provided with an underlying reinforcement, also perforated, opposite the rod-and-sleeve assemblies.

11. The device as set forth in claim 10, characterized in that it comprises, upstream of each rod-and-sleeve assembly, a vibratory hopper (30A) adapted to bring the prunes, one by one, into a substantially vertical position in the respective troughs of the successive tanks (20A).

12. The device as set forth in claim 8, characterized in that the rod-and-sleeve assemblies are actuated simultaneously by a jack (43A).

13. The device as set forth in claim 8, characterized in that it comprises detection means (90A) adapted to monitor the fall of the pits after they have passed through a corresponding trough (21A), as well as means adapted to collect the same (80A).

14. The device as set forth in claim 13, characterized in that it comprises, downstream of each rod-and-sleeve assembly, first discharge means (110A) adapted to remove from each of the respective troughs (21A) of the successive tanks (20A) the unpitted prunes detected by the checking means (90A), as well as second discharge means (130A) placed downstream of the first discharge means (110A) and adapted to remove the pitted prunes from each of the respective troughs (21A) of the successive tanks (20A).

15. The device as set forth in claim 8, characterized in that it comprises means (70A) for selectively collecting the pitted and unpitted prunes after they have been removed from the respective troughs (21A) of the successive tanks (20A).

16. The device as set forth in claim 8, characterized in that the first (110A) and the second (130A) discharge means comprise discharge punches controlled by at least one jack.

17. The device as set forth in claim 8, characterized in that it comprises a programmable automatic mechanism (95A) adapted to control the actuation of the discharge means (110A, 130A) as a function of the values sensed by the detection means (90A).

* * * * *